United States Patent
Kinkel (10) Patent No.: US 9,243,809 B2
(45) Date of Patent: Jan. 26, 2016

(54) COOLING SYSTEM AND METHOD OF COOLING AN INTERIOR SPACE

(75) Inventor: Stephen Kinkel, Phoenix, AZ (US)

(73) Assignee: UNITED METAL PRODUCTS, INC., Tempe, AZ (US)

( * ) Notice: Subject to any disclaimer, the term of this patent is extended or adjusted under 35 U.S.C. 154(b) by 958 days.

(21) Appl. No.: 13/397,170

(22) Filed: Feb. 15, 2012

(65) Prior Publication Data

US 2012/0211198 A1    Aug. 23, 2012

Related U.S. Application Data

(60) Provisional application No. 61/444,958, filed on Feb. 21, 2011.

(51) Int. Cl.
| | |
|---|---|
| F28F 27/00 | (2006.01) |
| F28D 15/00 | (2006.01) |
| F24F 1/02 | (2011.01) |
| F24F 5/00 | (2006.01) |
| F28F 25/00 | (2006.01) |
| F24F 1/00 | (2011.01) |

(52) U.S. Cl.
CPC ............... *F24F 1/02* (2013.01); *F24F 5/0035* (2013.01); *F24F 2001/0088* (2013.01); *F24F 2001/0092* (2013.01); *F28D 15/00* (2013.01); *F28F 25/00* (2013.01); *Y02B 30/545* (2013.01)

(58) Field of Classification Search
CPC ... F24F 1/02; F24F 5/0035; F24F 2001/0092; F24F 2001/0088; F24F 2001/0051; F24F 12/006; F24F 7/02; F24F 3/0444; F24F 3/10; Y02B 30/545; Y02B 30/563

USPC .......... 62/259.1, 259.2, 259.4; 454/241, 242; 312/236

See application file for complete search history.

(56) References Cited

U.S. PATENT DOCUMENTS

| | | | |
|---|---|---|---|
| 4,827,733 A * | 5/1989 | Dinh | 62/305 |
| 7,571,900 B2 | 8/2009 | Beck et al. | |
| 7,934,543 B2 | 5/2011 | Fieback et al. | |
| 2009/0032228 A1 | 2/2009 | Veltkamp et al. | |
| 2009/0241564 A1 * | 10/2009 | Kinkel | 62/93 |
| 2009/0311951 A1 * | 12/2009 | Walkinshaw | 451/261 |
| 2010/0012291 A1 * | 1/2010 | Sporie | 165/61 |
| 2010/0154448 A1 | 6/2010 | Hay | |
| 2011/0079024 A1 | 4/2011 | Hakbijl et al. | |
| 2011/0100602 A1 | 5/2011 | Kinkel | |

* cited by examiner

*Primary Examiner* — Marc Norman
*Assistant Examiner* — Jon T Schermerhorn
(74) *Attorney, Agent, or Firm* — Schmeiser, Olsen & Watts LLP (57) ABSTRACT

A cooling system (20) includes a media exchanger (50), a cooling section (22), and a cooling circuit (120) for circulating a cooling fluid (130) between the media exchanger (50) and the cooling section (22). The media exchanger (50) receives outside air (38) and the cooling section (22) receives return air (32) from and interior space (34). When the cooling fluid (130) circulates into the cooling section (22) via the cooling circuit (120), the temperature of the return air (32) is reduced through indirect heat transfer between the cooling fluid (130) and the return air (32) to produce conditioned air (84). The conditioned air (84) is provided as supply air (46) into the interior space (34). When the cooling fluid circulates into the media exchanger via the cooling circuit, the temperature of the cooling fluid is reduced through direct heat transfer between the cooling fluid and the outside air.

10 Claims, 7 Drawing Sheets

FIG. 8

COOLING SYSTEM AND METHOD OF COOLING AN INTERIOR SPACE

TECHNICAL FIELD OF THE INVENTION

The present invention claims priority under 35 U.S.C. §119 (e) to: "Adiabatic Cooling Unit," U.S. Provisional Ser. No. 61/444,958, filed 21 Feb. 2011, which is incorporated by reference herein.

TECHNICAL FIELD OF THE INVENTION

The present invention relates generally to cooling systems. More specifically, the present invention relates to high efficiency economizer cooling.

BACKGROUND OF THE INVENTION

A data center is a facility used to house computing systems and associated components, such as telecommunications and storage systems. A data center can occupy one room of a building, one or more floors, or an entire building. Most of the equipment is often in the form of servers mounted in cabinets, which are usually placed in single rows forming corridors (so-called aisles) between them. This allows people access to the front and rear of each cabinet. The data center typically additionally includes redundant or backup power supplies, redundant data communications connections, environmental controls (e.g., air conditioning, fire suppression), and security devices.

Manufacturers of data center equipment continue to increase compute capability while at the same time improving compute efficiency. However, the power consumption of such servers is also rising despite efforts in low power design of integrated circuits. With the increased power consumption comes a commensurate increase in concentrated heat loads produced by the servers, network equipment, and storage facilities. The heat dissipated by this equipment is exhausted into the data center room. The heat collectively generated by densely populated racks can have an adverse effect on the performance and reliability of the equipment in the racks, since the equipment relies on the surrounding air for cooling. In addition to temperature, humidity can have an adverse effect on data center equipment. If the humidity is too high, water may begin to condense on internal components. If the humidity is too low, static electricity discharge may damage components.

Heating, ventilation, air conditioning (HVAC) systems required to control the temperature and humidity of the data center have been estimated to account for between twenty five to forty percent of power usage in data centers. Accordingly, HVAC systems are often an important part of the design of an efficient data center. In particular, infrastructure manufacturers and data center designers and operators are focusing on reducing power consumption from the non-compute part of the overall power load, which includes the HVAC systems, in order to achieve significant cost savings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

Embodiments entail a cooling system and methodology for high efficiency cooling of an interior space, such as a data center, warehouse, office building, or any other high heat load facility. In particular, the cooling system and methodology efficiently cool return air from the interior space and provide the cooled return air as supply air back into the interior space. Additionally, the cooling system and methodology can provide a ventilation function, where outside air is mixed with the return air on an as needed basis. The mixture of cooled return air and outside air can than be released into the interior space as the supply air. The system structural configuration enables a smaller footprint. Additionally, the system and methodology can reduce power consumption over prior art systems. Accordingly, significant cost savings can be achieved by utilizing smaller and more efficient cooling systems and methods that reduce energy use.

Figure 1:
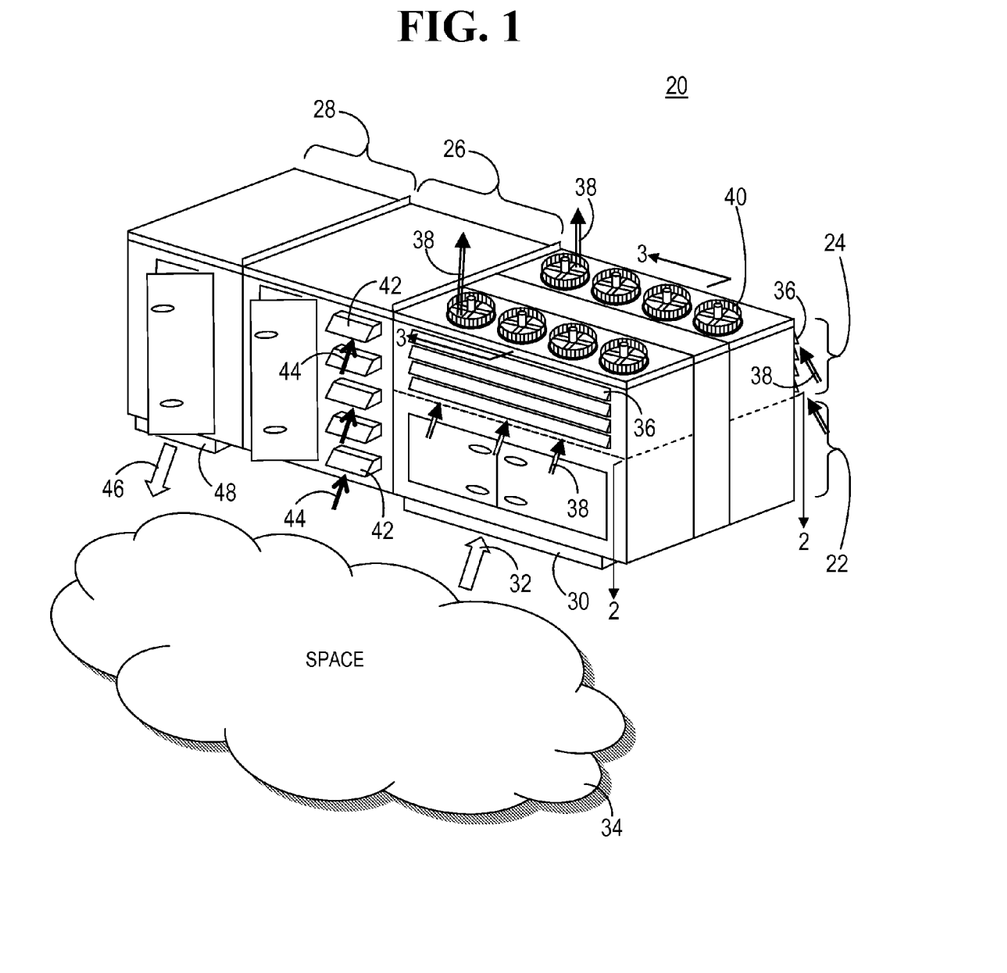
FIG. 1 shows a perspective view of a cooling system in accordance with an embodiment.

FIG. 1 shows a perspective view of a cooling system 20 in accordance with an embodiment. Cooling system 20 is a heat exchanger system in which there is efficient heat transfer from one medium to another. More particularly, cooling system 20 implements a combination of direct contact, in which heat transfer occurs in the absence of a separating wall, and indirect contact, in which heat transfer occurs across a separating wall.

Cooling system 20 generally includes a cooling section 22, a media exchange section 24, a mixing section 26, and a supply section 28. Cooling section 22 includes an air inlet 30 which is configured to receive return air 32 from an interior space 34. Media exchange section 24 has outside air inlets 36 for receiving outside air 38 (i.e., air that is external to interior space 34) and outside air outlets 40 for discharging outside air 38. As will be discussed in detail below, cooling section 22 and media exchange section 24 operate cooperatively to efficiently cool return air 32. The cooled return air 32 is subsequently released as conditioned air into mixing section 26.

Mixing section 26 also includes outside air inlets 42. At mixing section 26, the conditioned air may be mixed with outside air 44 drawn into mixing section 26 via outside air inlets 42 to meet suitable temperature, humidity, and/or fresh air requirements. This mixture of conditioned air and outside air 44 is then released from mixing section 26 as supply air 46 into supply section 28 (discussed below). Supply air 46 is released back into interior space 34 via a supply air outlet 48 of supply section 28. Supply air 46 enters interior space 34 where the process load (e.g., heat discharge from servers, power supplies, and other equipment) in interior space 34 increases the temperature of supply air 46. As supply air 46 heats up to a pre-set temperature, supply air 46 enters return air inlet 30 of cooling section 22 as return air 32 to repeat the cooling process.

It will be observed that different arrow styles are utilized in FIG. 1, as well as the remaining FIGS. 2-5. The different arrow styles are utilized to distinguish various air sources and/or purposes of the air employed in cooling system 20. For example, return and supply air 32 and 46, respectively are represented by block arrows. Outside air 38 entering and exiting media exchange section 24 is represented by solid arrowheads with a double-lined shaft. And, outside air 44 entering mixing section 26 is represented by single lined arrowheads and shaft. It should be understood, however, that return and supply air 32 and 46, respectively, is the air exiting and air entering interior space 34. In contrast, both outside air 38 and 44 represents the air entering cooling system 20 from the environment external to both cooling system 20 and interior space 34. However, outside air 38 and 44 is entering to different sections of cooling system 20 for different purposes.

In the illustrated embodiment, cooling system 20 is a roof mount unit. Accordingly, return air inlet 30 and supply air outlet 48 are located in the bottom of cooling system 20. However, in alternative embodiments, cooling system 20 may be configured as top, end, or side discharge and return configurations. Additionally, cooling section 22, media exchange section 24, mixing section 26, and supply section 28 are modular components that can be readily configured in accordance with a particular cooling configuration. Furthermore, cooling section 22 and media exchange section 24 are arranged in a stacked configuration to effectively reduce the footprint of cooling system 20. Thus, cooling system 20 can be readily scaled in accordance with particular cooling constraints for interior space 34.

Figure 2:
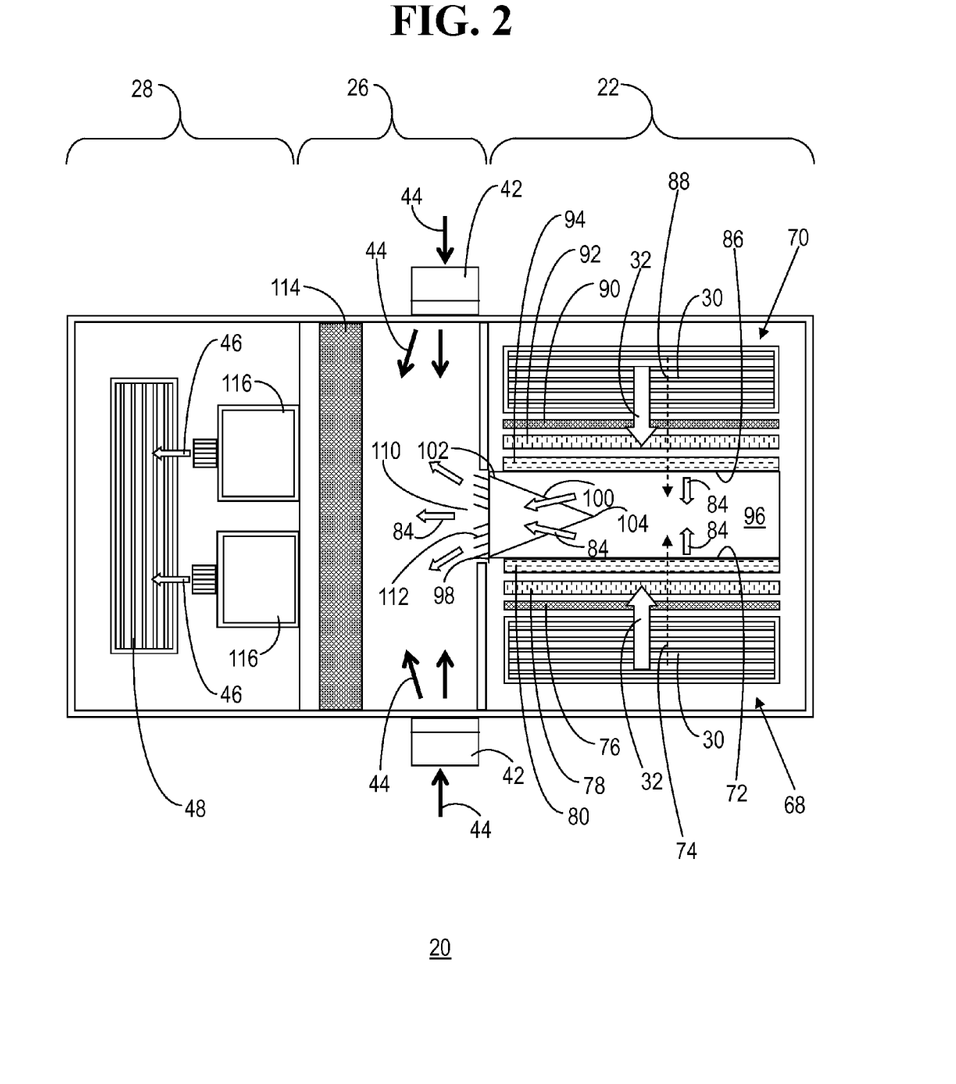
FIG. 2 shows a top view of the cooling system along section lines 2-2 of FIG. 1.
Figure 3:
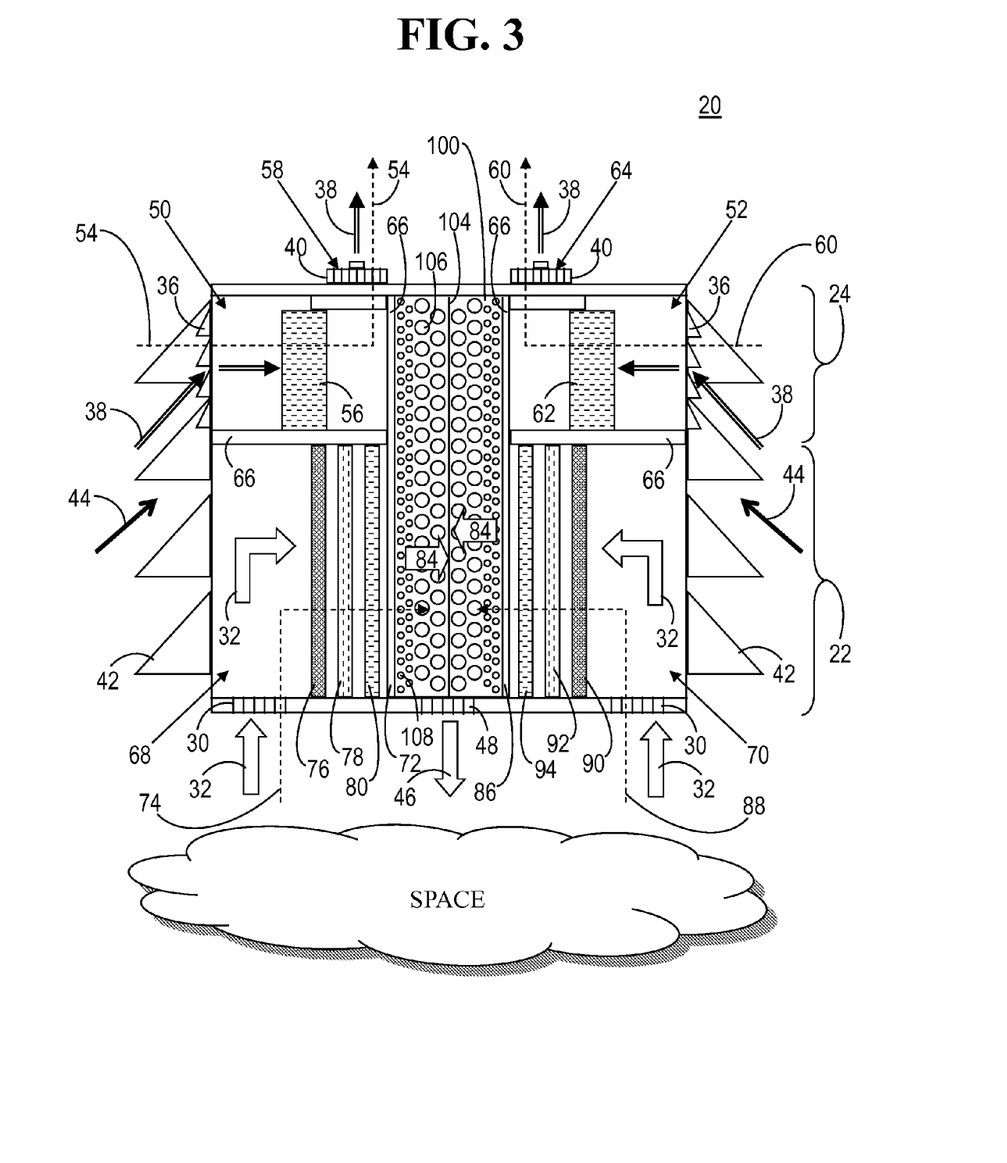
FIG. 3 shows a rear view of the cooling system along section lines 3-3 of FIG. 1.

Referring to FIGS. 2-3, FIG. 2 shows a top view of cooling system 20 along section lines 2-2 of FIG. 1, and FIG. 3 shows a rear view of cooling system 20 along section lines 3-3 of FIG. 1. Thus, FIG. 2 represents a top internal view of cooling section 22, mixing section 26, and supply section 26. Whereas, FIG. 3 represents a rear internal view of cooling section 22 and media exchange section 24.

As expressly shown in FIG. 3, media exchange section 24 includes a first media exchanger 50 and a second media exchanger 52. First media exchanger 50 has outside air inlets 36 and outside air outlets 40. First media exchanger 50 accepts outside air 38 via a first outside air path 54 (denoted by a dashed line). Outside air 38 passes through evaporative media 56 located in first media exchanger 50 to one or more fans 58 and is released out of first media exchanger 50 into the atmosphere. Likewise, second media exchanger 52 accepts outside air 38 via a second outside air path 60 (also denoted by a dashed line). Outside air 38 passes through evaporative media 62 located in second media exchanger 52 to one or more fans 64 and is released out of second media exchanger 52 into the atmosphere.

Evaporative media 56 and 62 may be formed from a cellulose based paper, flame retardant material, aspen fiber material, or any other material typically utilized in evaporative cooling configurations in which water flowing through the media cools and/or humidifies air flowing through the evaporative media. Thus, first and second media exchangers 50 and 52 serve as direct exchangers in which heat transfer occurs in the absence of a separating wall.

Cooling section 22 is physically separated from first and second media exchangers 50 and 52, respectively, of media exchange section 24 via solid walls 66. Cooling section 22 includes a first cooling section, referred to hereinafter as a first cooler 68 and a second cooling section, referred to hereinafter as a second cooler 70. First cooler 68 has return air inlet 30 and a first conditioned air outlet 72. First cooler 68 is configured to receive return air 32 from interior space 34 via a first return air path 74 (denoted by a dashed line). In an embodiment, first cooler 68 includes a filter 76, which is in line with an indirect exchanger 78, which is likewise in line with a direct exchanger 80. Accordingly, when return air 32 is received at return inlet 30 of first cooler 68, return air 32 in first return air path 74 passes through filter 76, indirect exchanger 78, and direct exchanger 80 to produce conditioned air 84 which is output from first conditioned air outlet 72.

Likewise, second cooler 70 has return air inlet 30 and a second conditioned air outlet 86. Second cooler 70 is configured to receive return air 32 from interior space 34 via a second return air path 88 (denoted by a dashed line). In an embodiment, second cooler 70 includes a filter 90, which is in line with an indirect exchanger 92, which is likewise in line with a direct exchanger 94. Accordingly, when return air 32 is received at return inlet 30 of second cooler 70, return air 32 in second return air path 88 passes through filter 90, indirect exchanger 92, and direct exchanger 94 to produce conditioned air 84 which is output from second conditioned air outlet 86. First and second coolers 68 and 70 generally cool return air 32 to produce conditioned air 84. The cooling methodology implemented through the cooperative operation of cooling section 22 and media exchange section 24 will be discussed below in connection with FIGS. 4 and 5.

A diffusion chamber 96 is in communication with each of first and second conditioned air outlets 72 and 86, respectively. More particularly, diffusion chamber 96 is interposed between first and second conditioned air outlets 72 and 86. Accordingly, conditioned air 84 in each of first and second return air paths 74 and 88 oppose one another as conditioned air 84 enters diffusion chamber 96. Although conditioned air 84 in each of air paths 74 and 88 is represented by a single arrow, it should be understood that first and second conditioned air outlets 72 and 86 are formed as large as possible to enable a suitable and largely unobstructed flow of conditioned air 84 from respective first and second coolers 68 and 70 into diffusion chamber 96.

Diffusion chamber 96 includes a chamber outlet 98 located at an end of diffusion chamber 96 and oriented approximately perpendicular to first and second conditioned air outlets 72 and 86. A diffusion baffle 100 is located at chamber outlet 98. In an embodiment, diffusion baffle 100 is a tapered structure having a base 102 and an apex 104. Base 102 is located in chamber outlet 98, and apex 104 extends into diffusion chamber 96.

Diffusion baffle 100 includes a plurality of openings through which conditioned air 84 exits diffusion chamber 96. Openings 106 in diffusion baffle 100 located proximate apex 104 are larger in diameter than openings 108 in diffusion baffle located proximate base 102. The tapered shape of diffusion baffle 100 and the arrangement of diameters of openings 106 and 108 facilitate the uniform flow of conditioned air 84 in diffusion chamber 96 and exiting diffusion chamber 96 via chamber outlet 98. This uniform flow serves to balance air flow through the components of first and second coolers 68 and 70 to achieve more effective heat exchange.

In the illustrated embodiment, diffusion baffle 100 includes two different sizes of openings 106 and 108. However, it should be understood that there may be more than two different sizes of openings, with the larger openings being located closer to apex 104 and the smaller openings being located closes to base 102. Moreover, the openings need not be circular, but may instead be oval, rectangular, triangular, or any other suitable shape. Additionally, the openings in diffusion baffle 100 may be adjustable through the implementation of a movable plate or valves to control the flow of conditioned air through diffusion baffle 100.

Mixing section 26 includes a conditioned air inlet 110 in fluid communication with first and second conditioned air outlets 72 and 86. More particularly, conditioned air 84 flowing out of first and second conditioned air outlets 72 and 86, into diffusion chamber 96, through diffusion baffle 100, and out of chamber outlet 98 flows into mixing section 26 via conditioned air inlet 110. In an embodiment, conditioned air inlet 110 may include a directional louver structure 112 configured to admit conditioned air 84 into mixing section 26. Directional louver structure 112 can include slats that diffuse or otherwise spread conditioned air 84 outwardly into mixing section 26.

In an embodiment, conditioned air 84 in mixing section 26 may blend with outside air 44 entering mixing section 26 via outside air inlets 42 to meet suitable temperature, humidity, and/or fresh air requirements for supply air 46. Outside air inlets 42 may include adjustable dampers, vanes, louvers, or other structure that may be manually or automatically adjusted to admit a suitable flow of outside air 44, or alternatively, to prevent entry of outside air 44 into mixing section 26 when outside air conditions are not suitable. The mixture of conditioned air 84 and outside air 44 may subsequently pass through a filter 114 located in mixing section 26 in order to filter dust and/or other contaminants that may have entered mixing section 26. Conditioned air 84 then passes out of mixing section 26 and into supply section 28 via fans 116. By way of example, fans 116 pull conditioned air 84 out of mixing section 26 as supply air 46. This supply air 46 is subsequently released into interior space 34 via supply air outlet 48.

Figure 4:
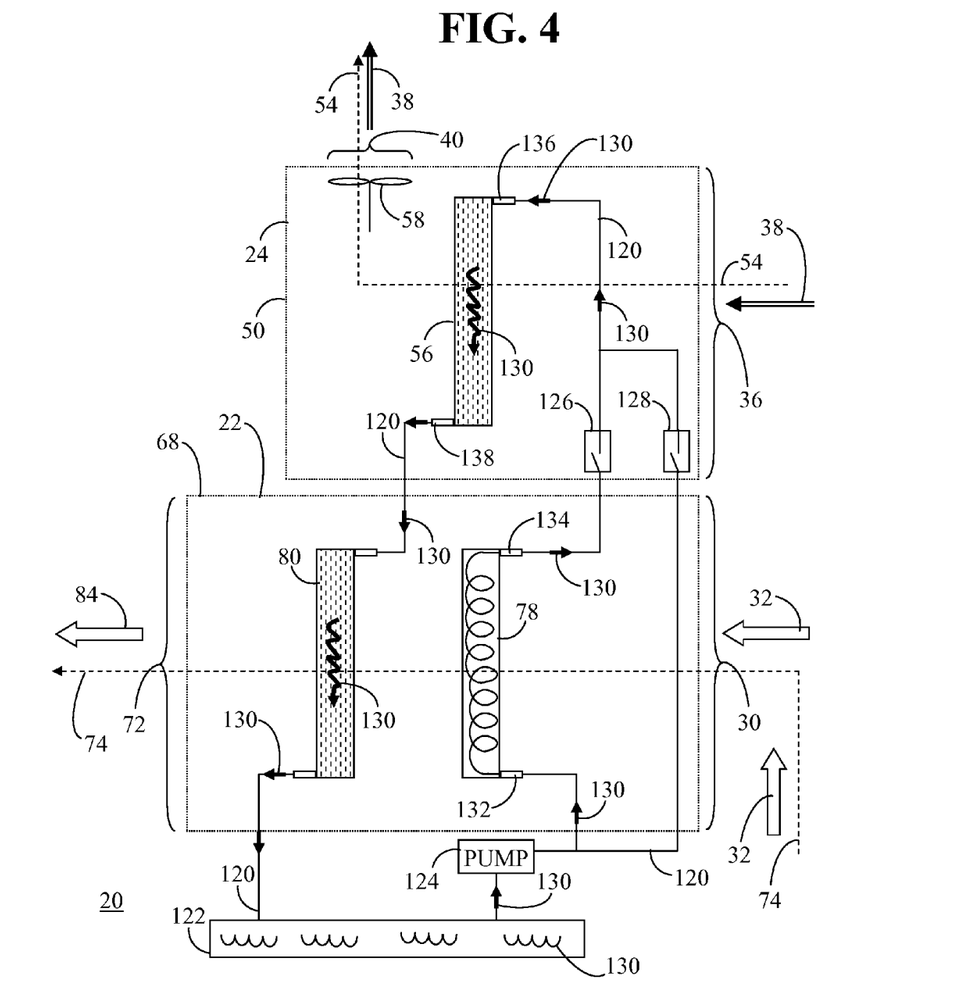
FIG. 4 shows a block diagram of a cooling methodology of the cooling system of FIG. 1.

FIG. 4 shows a block diagram of the cooling methodology of cooling system 20 of FIG. 1. The cooling methodology is described in connection with first cooler 68 of cooling section 22 and first media exchanger 50 of media exchange section 24. However, the following discussion applies equivalently to second cooler 70 (FIG. 3) of cooling section 22 and second media exchanger 52 (FIG. 3) of media exchange section 24. First cooler 68 and first media exchanger 50 function cooperatively as an air cooler to reduce the temperature of return air 32 entering cooling section 22. The temperature reduction in first cooler 68 is done using the heat in outside air 38 entering first media exchanger 50, thus enhancing the efficiency of cooling system 20.

First cooler 68 generally includes return air inlet 30, filter 76 (FIGS. 2-3), indirect exchanger 78, direct exchanger 80, and first conditioned air outlet 72. First media exchanger 50 generally includes outside air inlets 36, evaporative media 56, fans 58, and outside air outlets 40. Cooling system 20 further includes a cooling circuit 120, a sump 122 (e.g., a basin or reservoir), a pump 124, a first flow control valve 126, and a second flow control valve 128.

In accordance with a method of cooling return air 32, pump 124 pumps a cooling fluid 130 from sump 122 through cooling circuit 120 to indirect exchanger 78. In an embodiment, cooling fluid 130 is water. However, those skilled in the art will recognize that other heat transporting fluids may alternatively be used. Indirect exchanger 78 is a heat exchanger having a cooling fluid input 132 and a cooling fluid output 134, and is sometimes referred to as a coil. Indirect exchanger 78 is configured to transfer heat between return air 32 in first return air path 74 and cooling fluid 130 to alter the temperature of return air 32 in first return air path 74. In particular, return air 32 in first return air path 74 transfers its heat to cooling fluid 130, so that return air 32 cools and cooling fluid 130 heats in indirect exchanger 78. By way of example, cooling fluid 130 flowing through indirect exchanger 78 may remove the sensible heat from return air 32 by twenty to thirty degrees, or more. There is no contact between cooling fluid 130 and return air 32 while return air 32 passes through indirect exchanger 78. Thus, return air 32 passing through indirect exchanger 78 is indirectly cooled.

From indirect exchanger 78, cooling fluid 130 flows within cooling circuit 120 through first flow control valve 126 to first media exchanger 50. First media exchanger 50, and more specifically, evaporative media 56, is a heat exchanger that transfers heat between cooling fluid 130 and outside air 38 in first outside air path 54. This heat transfer function is performed to alter the temperature of cooling fluid 130. Cooling fluid 130 enters evaporative media 56 at a media exchanger input 136, flows through evaporative media 56, and exits evaporative media 56 at a media exchanger output 138. There is direct contact between cooling fluid 130 and outside air 38 flowing through evaporative media 56 via first outside air path 54. As outside air 38 passes through evaporative media 56, most of the sensible heat (i.e., the heat exchanged by a body that has as its sole effect a change of temperature) that is in outside air 38 is turned into latent heat (i.e., the heat absorbed or released during a change of phase at constant temperature and pressure). In addition, sensible heat is transferred from cooling fluid 130 to outside air 38 in first media exchanger 50. Outside air 38 containing the latent heat and the heat absorbed from cooling fluid 130 above the wet bulb temperature is discharged from outside air outlets 40 via fans 58.

In an embodiment, direct contact between cooling fluid 130 and outside air 38 reduces the dry bulb temperature of cooling fluid 130 to within approximately one to two degrees of wet bulb temperature. The dry bulb temperature is the temperature of a fluid as measured by a standard thermometer freely exposed to the fluid but shielded from radiation and moisture. The dry bulb temperature does not indicate the amount of moisture in the fluid. In contrast, the wet bulb temperature is the lowest temperature that can be obtained by evaporating water into the air. It is the wet bulb temperature of outside air 38 that permits outside air 38 in first outside air path 54, having the same or lower temperature as return air 32 in first return air path 74, to reduce the temperature of cooling fluid 130.

In one embodiment, first return air path 74 passes through direct exchanger 80 after passing through indirect exchanger 78. Direct exchanger 80 is a heat exchanger that transfers heat between return air 32 in first return air path 74 and cooling fluid 130 to further alter the temperature of return air 32 in first return air path 74. Unlike in indirect exchanger 78, there is contact between cooling fluid 130 and return air 32 in first return air path 74 while return air 32 passes through direct exchanger 80, thus altering the humidity level of return air 32 in first return air path 74. To that end, cooling fluid 130 flows from first media exchanger 50 in cooling circuit 120 to direct exchanger 80 before returning to sump 122. By using direct exchanger 80, the temperature of return air 32 in first return air path 74 may be brought to a lower level than the temperature was after indirect exchanger 78. However, the humidity level of return air 32 in first return air path 74 is increased when return air 32 passes through direct exchanger 80, as return air 32 comes in direct contact with cooling fluid 130. Return air 32 in return air path 74 then passes out of first conditioned air outlet 72 of first cooler 68 as conditioned air 84.

In some embodiments, direct exchanger 80 may not be utilized. When direct exchanger is not utilized, cooling fluid 130 flows from first media exchanger 50 in cooling circuit 120 and returns to sump 122 through, for example, a return pipe (not shown). As such, the temperature of conditioned air 84 produced by first cooler 68 will only be lowered by indirect exchanger 78, but the humidity of conditioned air 84 will not be increased.

Cooling system 20 may include additional features, not illustrated herein for simplicity. For example, cooling system 20 may include a flush line (not shown) that directs the flow of cooling fluid 130 from cooling circuit 120 directly to sump 122. The flush line can travel along the top of evaporative media 56, directly contacting the surface of evaporative media 56. This permits cooling fluid 130 that flows through the flush line to flush out any debris that may be collected along the top surface of evaporative media 56. A flush valve (not shown) can be placed on the flush line to regulate when cooling fluid 130 flows through the flush line. Periodically, the flush valve may be opened so that cooling fluid 130 flows through the flush line, and the surface of evaporative media 56 is cleared of debris. Cooling fluid 130 that flows through the flush line can aid in removing any debris that may obstruct the flow through first media exchanger 50. The flush line can empty into sump 122, returning cooling fluid 130 to be recirculated through cooling circuit 120. The flush valve may be opened periodically (e.g., hourly) to effectively remove debris, as needed.

As mentioned above, first and second flow control valves 126 and 128 are inline with cooling circuit 120. First flow control valve 126 controls the flow of cooling fluid 130 from indirect exchanger 78 to first media exchanger 50. As cooling fluid 130 flows through indirect exchanger 78, cooling fluid 130 is heated by return air 32 in first return air path 74. The flow of this heated cooling fluid 130 to first media exchanger 50 can be regulated by first flow control valve 126, thus partially regulating the level of flow and temperature of cooling fluid 130 that enters first media exchanger 50. Second flow control valve 128 controls the flow of cooling fluid 130 directly from sump 122. In some embodiments, cooling circuit 120 is configured to permit cooling fluid 130 to flow either indirectly to first media exchanger 50, by way of indirect exchanger 78, or directly first media exchanger 50. Second flow control valve 128 regulates the flow of cooling fluid 130 flowing directly to first media exchanger 50.

By controlling the flow through both first and second flow control valves 126 and 128, cooling fluid 130 from indirect exchanger 78 is mixed with cooling fluid 130 directly from sump 122 as cooling fluid 130 enters evaporative media 56 of first media exchanger 50 for further heat exchange. By changing the flow through first or second flow control valves 126 or 128, the temperature of cooling fluid 130 that enters first media exchanger 50 can be altered. In addition, by regulating the amount of cooling fluid 130 that flows into first media exchanger 50, first and second flow control valves 126 and 128 affect the temperature of cooling fluid 130 in sump 122. This is because the temperature of cooling fluid 130 in sump 122 will decrease if a larger amount of cooled cooling fluid 130 enters sump 122. Regulating the temperature of cooling fluid 130 in this way also regulates the temperature of cooling fluid 130 that enters indirect exchanger 78, thus regulating the amount of heat energy that must be transferred in indirect exchanger 78 to ultimately regulate the temperature of return air 32 in first return air path 74.

Figure 5:
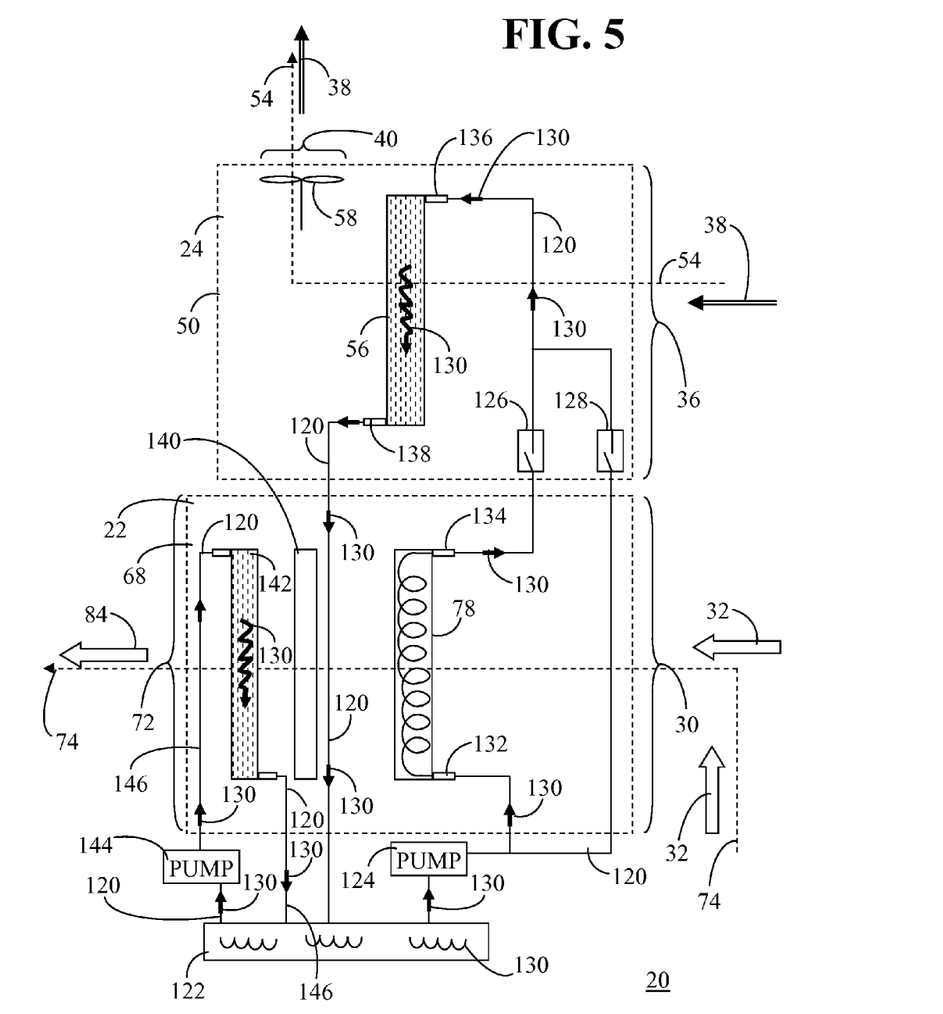
FIG. 5 shows a block diagram of a cooling methodology of the cooling system of FIG. 1 in accordance with another embodiment.

FIG. 5 shows a block diagram of the cooling methodology of cooling system 20 in accordance with another embodiment. Again, the cooling methodology is described in connection with first cooler 68 of cooling section 22 and first media exchanger 50 of media exchange section 24. However, the following discussion applies equivalently to second cooler 70 (FIG. 3) of cooling section 22 and second media exchanger 52 (FIG. 3) of media exchange section 24. First cooler 68 and first media exchanger 50 function cooperatively as an air cooler to reduce the temperature of the return air 32 entering cooling section 22. The temperature reduction in first cooler 68 is done using the heat in outside air 38 entering first media exchanger 50, thus enhancing the efficiency of cooling system 20. In addition, first cooler 68 includes a refrigerant-based direct expansion cooling unit 140, such as a direct expansion cooling unit, and a direct cooler 142 in line with indirect exchanger 78. The cooling methodology represented in FIG. 5 that includes refrigerant based cooling unit 140 and direct cooler 142 may be utilized to cool return air 32 at times when outside air 38 may be too hot and/or too humid for indirect exchanger 78 to effectively cool cooling fluid 130, and subsequently cool return air 32.

In accordance with a method of cooling return air 32, pump 124 pumps a cooling fluid 130 from sump 122 through cooling circuit 120 to indirect exchanger 78. Return air 32 in first return air path 74 transfers its heat to cooling fluid 130, so that return air 32 cools and cooling fluid 130 heats in indirect exchanger 78. From indirect exchanger 78, cooling fluid 130 flows within cooling circuit 120 and enters evaporative media 56 of first media exchanger 50. As outside air 38 passes through evaporative media 56 heat is transferred from cooling fluid 130 to outside air 38 in first media exchanger 50 and outside sir 38 is discharged from outside air outlets 40 via fans 58.

In the illustrated embodiment, cooling fluid 130 flows from first media exchanger 50 in cooling circuit 120 and returns to sump 122. However, return air 32 in first return air path 74 passes through refrigerant based cooling unit 140 after passing through indirect exchanger 78. Cooling unit 140 cools return air 32 by directly passing return air 32 over an evaporator in which refrigerant absorbs heat in return air 32. By using refrigerant based cooling unit 140, the temperature of return air 32 in first return air path 74 is brought to a lower level than the temperature was after indirect exchanger 78. However, the humidity level of return air 32 in first return air path 74 does not change when return air 32 passes through cooling unit 140. Return air 32 in first return air path 74 then passes out of first conditioned air outlet 72 of first cooler 68 as conditioned air 84.

Return air 32 may then pass through direct cooler 142 to further cool return air 32. In an embodiment, direct cooler 142 is a direct evaporative cooler. As such, a second pump 144 is in line with a second loop 146 of cooling circuit 120. Second pump 144 circulates cooling fluid 130 through second loop 146 of cooling circuit 120 from sump 120 to direct evaporative cooler 142 from which cooling fluid 130 returns to sump 120. Indirect cooler 78, refrigerant based cooling unit 140, and/or direct evaporative cooler 142 may be suitably controlled to obtain high efficiency cooling in under a variety of environmental conditions.

Although the second stage cooling configuration of FIG. 5 is represented by both refrigerant based cooling unit 140 and direct evaporative cooler 142, it should be understood that alternative embodiments may include only one of refrigerant based cooling unit 140 and direct evaporative cooler 142, a chilled water cooling unit, or some combination thereof. Accordingly, the cooling capability of such a cooling system can be adjusted to cool the final delivered air, i.e., supply air 46 (FIG. 1) as the web bulb temperature of outside air 38 (FIG. 1) rises and falls during operation.

Figure 6:
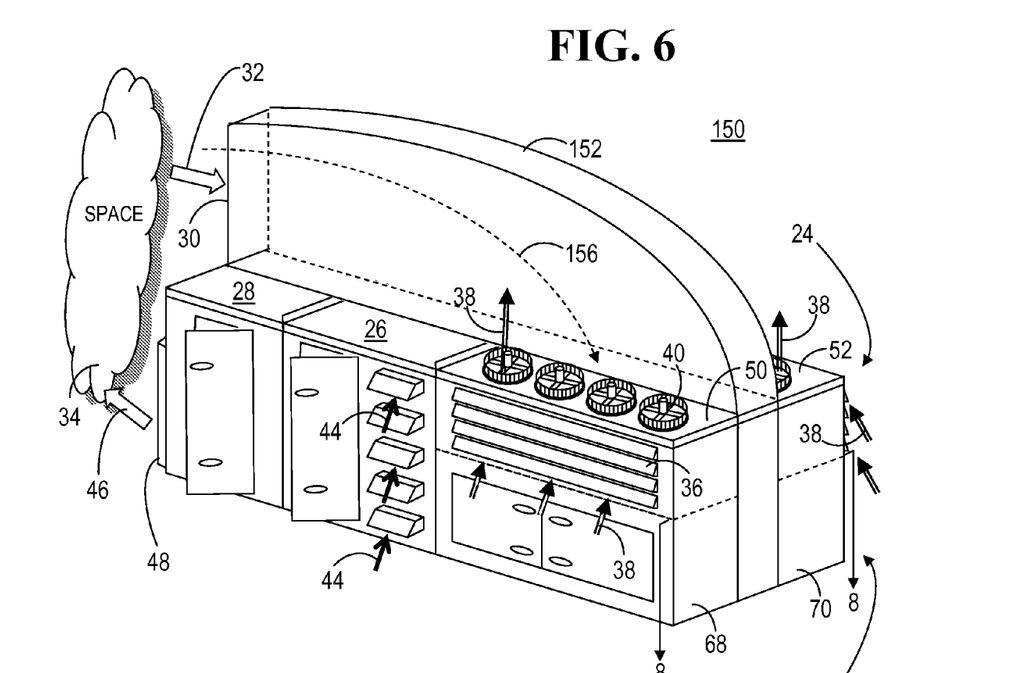
FIG. 6 shows a perspective view of a cooling system in accordance with another embodiment.
Figure 7:
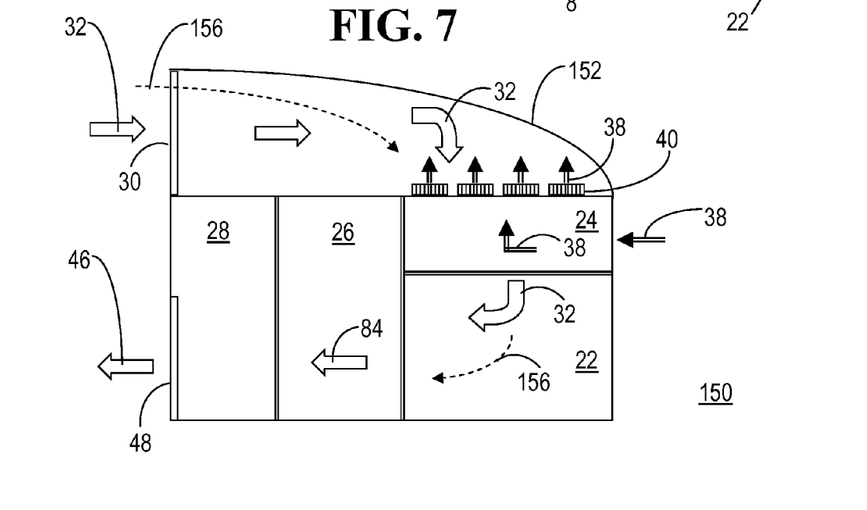
FIG. 7 shows a side diagrammatic view of the cooling system of FIG. 6.
Figure 8:
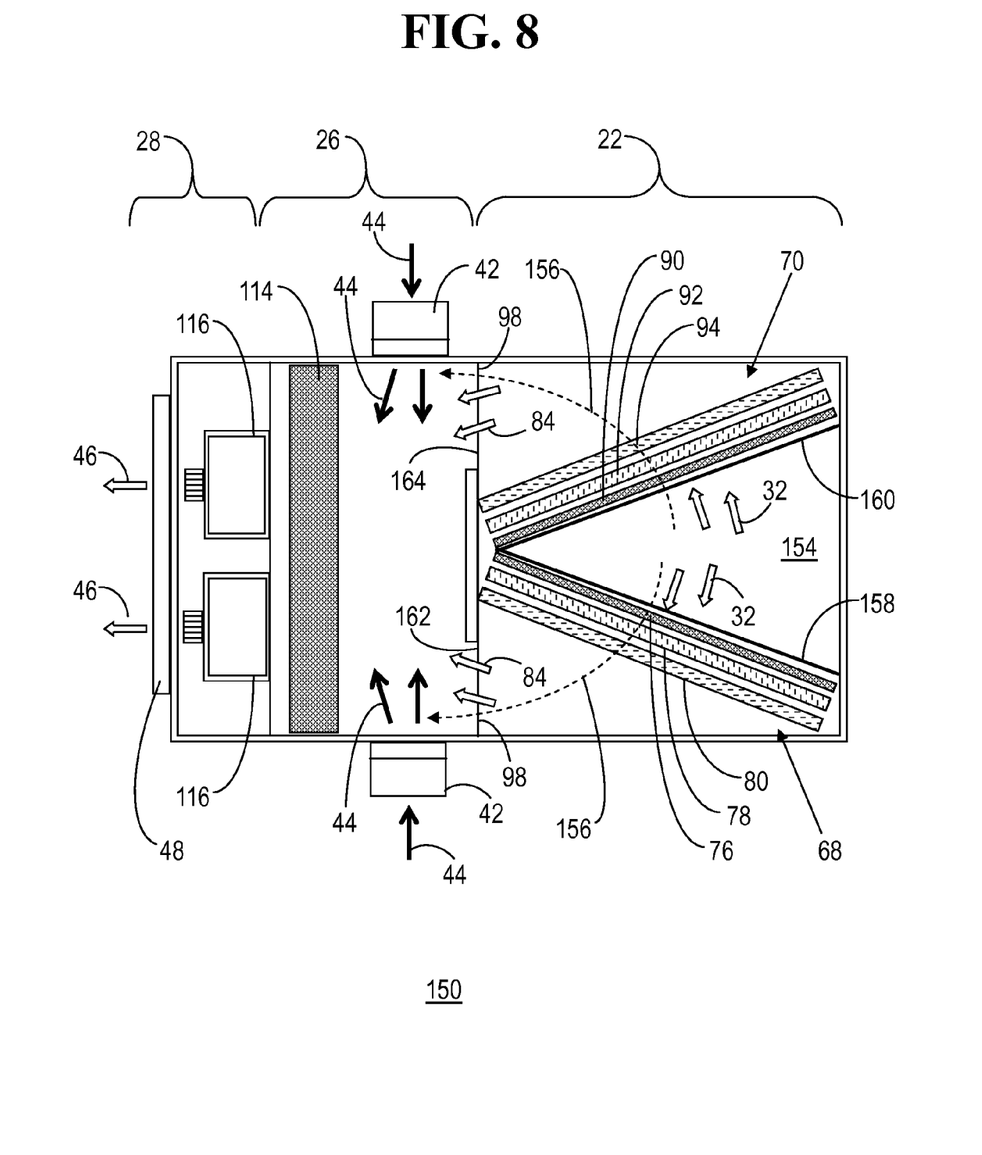
FIG. 8 shows a top view of the cooling system along section lines 8-8 of FIG. 6.

Referring now to FIGS. 6-8, FIG. 6 shows a perspective view of a cooling system 150 in accordance with another embodiment. FIG. 7 shows a side diagrammatic view of cooling system 150, and FIG. 8 shows a top view of cooling system 150 along section lines 8-8 of FIG. 6. In the above presented embodiment, cooling system 20 (FIG. 1) is illustrated as being a roof mount unit. Cooling system 150 is presented with an end discharge and return configuration suitable for a ground mount design. Accordingly, return air inlet 30 and supply air outlet 48 are located at an end of cooling system 150.

Cooling system 150 includes cooling section 22, media exchange section 24, mixing section 26, and supply section 28, with cooling section 22 and media exchange section 24 being arranged in a stacked configuration. In addition, cooling system 150 includes first media exchanger 50, second media exchanger 52, a first cooling section, i.e., first cooler 68, and a second cooling section, i.e., second cooler 70, as discussed above. A detailed description of first media exchanger 50, second media exchanger 52, first cooler 68, and second cooler 70 will not be repeated herein for brevity.

In contrast to cooling system 20 (FIG. 1), however, cooling system 150 does not include diffusion chamber 96 (FIG. 2). Instead, cooling system 150 includes a return air duct 152 to which return air inlet 30 is coupled, and an inlet chamber 154 interposed between first and second coolers 68 and 70, respectively. That is, in this ground mount design, the space between first and second coolers 68 and 70 that was formerly diffusion chamber 96 now functions as inlet chamber 154.

Inlet chamber 154 is configured to receive return air 32 from interior space 34 via a return air path 156 directed from return air inlet 30, through return air duct 152 and into inlet chamber 154. A portion of the received return air 32 enters first cooler 68 via a first return air inlet 158 and another portion of the received return air 32 enters second cooler 70 via a second return air inlet 160. First and second coolers 68 and 70 may be suitably configured as discussed above in connection with FIG. 4 to include filters 76, 90, indirect heat exchangers 78, 92, and direct heat exchangers 80, 90. Alternatively, first and second coolers 68 and 70 may be suitably configured as discussed above in connection with FIG. 5 to include filters 76, 90, indirect heat exchangers 78, 92, refrigerant based cooling unit 140, and direct evaporative cooler 142.

Return air 32 is cooled to produce conditioned air 84 which is output from first and second conditioned air outlets 162 and 164 of corresponding first and second coolers 68 and 70. Conditioned air 84 is released into mixing section 26 where it may be mixed with outside air 44 as needed. Fans 116 then pull conditioned air 84 out of mixing section 26 as supply air 46. This supply air 46 is subsequently released into interior space 34 via supply air outlet 48.

The components, e.g., filters, heat exchangers, and the like, are illustrated in FIG. 8 as being angled or suitably canted to provide a uniform surface for passage of return air 32. In addition, the individual components, e.g., filters, heat exchangers, and the like, are rearranged opposite to those shown in cooling system 20 since return air 32 flows in the opposite direction through cooling section 22 of cooling system 150 relative to the flow of return air 32 through cooling section 22 of cooling system 20 (FIG. 1). Cooling system 150 may also be readily adapted to include a diffusion baffle resembling, for example, diffusion baffle 100 (FIG. 2), a louver structure resembling, for example, directional louver structure 112 (FIG. 2), and so forth for the purposes described above.

In summary, embodiments entail a cooling system and methodology for high efficiency cooling of an interior space, such as a data center, warehouse, office building, or any other suitable location. The cooling system and methodology efficiently cool return air from the interior space and provide the cooled return air as supply air back into the interior space. In particular, the cooling system and methodology employ a configuration of indirect and direct heat transfer in which circulating cooling fluid may be utilized to cool the return air via indirect heat transfer (and optionally direct heat transfer). Outside air is then utilized to cool the heated cooling fluid through direct heat transfer. The cooling system and methodology can mix outside air with the return air on an as needed basis. The mixture of cooled return air and outside air can than be released into the interior space as the supply air. The system and methodology can reduce power consumption over prior art systems. Additionally, the stacked configuration of the media exchanger and its associated cooler unit enables a smaller footprint, and the modular sections allow for single inlet small versions, as well as multiple inlet larger capacity versions. Accordingly, significant cost savings can be achieved by utilizing smaller and more efficient cooling systems and methods that reduce energy use.

Although the preferred embodiments of the invention have been illustrated and described in detail, it will be readily apparent to those skilled in the art that various modifications may be made therein without departing from the spirit of the invention or from the scope of the appended claims. For example, the system can be adapted to include more or less stages of cooling and or may include a dehumidification mode. In addition, various mathematical and intuitive techniques can be used for determining size and configuration of a particular cooling system, size of evaporative media, which stage of cooling may be implemented in response to temperature and humidity conditions, size and quantity of openings in the diffusion baffle, and so forth.

What is claimed is:

1. A cooling system comprising:
a media exchanger having an outside air inlet and an outside air outlet, said media exchanger receiving outside air at said outside air inlet via an outside air path;
a cooling section having a return air inlet and a conditioned air outlet, said cooling section being configured to receive return air at said return air inlet from an interior space via a return air path;
a cooling circuit for circulating a cooling fluid between said cooling section and said media exchanger, wherein when said cooling fluid circulates into said cooling section, said cooling section reduces a temperature of said return air in said return air path with said cooling fluid to produce conditioned air and outputs said conditioned air from said conditioned air outlet, and when said cooling fluid circulates into said media exchanger, said media exchanger cools said cooling fluid in said cooling circuit with said outside air and releases said outside air in said first air path from said cooling system;
a diffusion baffle in communication with said conditioned air outlet for enabling uniform flow of said conditioned air from said conditioned air outlet, wherein said media exchanger is a first media exchanger, said cooling section is a first cooling section, said conditioned air outlet is a first conditioned air outlet, said cooling circuit is a first cooling circuit;
a second media exchanger having a second outside air inlet and a second outside air outlet, said second media exchanger receiving said outside air at said second outside air inlet via a second outside air path;
a second cooling section having a second return air inlet and a second conditioned air outlet, said second cooling section being configured to receive said return air from said interior space via a second return air path;

a second cooling circuit for circulating said cooling fluid between said second cooling section and said second media exchanger, wherein when said second cooling fluid circulates into said second cooling section, said second cooling section reduces said temperature of said return air in said second return air path with said cooling fluid to produce said conditioned air and outputs said conditioned air from said second conditioned air outlet, and when said cooling fluid circulates into said second media exchanger, said second media exchanger cools said cooling fluid in said second cooling circuit with said outside air and releases said outside air in said second outside air path from said cooling system; and a diffusion chamber in communication with each of said first and second conditioned air outlets, said diffusion baffle being located at a chamber outlet of said diffusion chamber, wherein said chamber outlet is oriented approximately perpendicular to each of first and second conditioned air outlets, wherein said diffusion chamber is interposed between said first and second conditioned air outlets such that said first and second return air paths oppose one another as said conditioned air enters said diffusion chamber, said chamber outlet is positioned at an end of said diffusion chamber; and said diffusion baffle is cone shaped with a base and an apex, said base being located at said chamber outlet and said apex extending into said diffusion chamber, and said diffusion baffle including a plurality of openings, wherein ones of said openings proximate said apex are larger in diameter than others of said openings located proximate said base.

2. A cooling system as claimed in claim 1 further comprising a mixing section configured to receive said outside air and a having conditioned air inlet in fluid communication with said conditioned air outlet of said cooling section configured to receive said conditioned air, said mixing section being configured to mix said outside air with said conditioned air received at said conditioned air inlet to produce supply air for release into said interior space.

3. A cooling system as claimed in claim 2 further comprising a directional louver located at said conditioned air inlet, said directional louver being configured to admit said conditioned air into said mixing section.

4. A cooling system as claimed in claim 1 further comprising a fan section in fluid communication with said conditioned air outlet of said cooling section, said fan section being configured to receive said conditioned air and output said conditioned air as supply air into said interior space.

5. A cooling system as claimed in claim 1 wherein said cooling section includes an indirect exchanger, and said return air is cooled by said cooling fluid while passing from said return air inlet to said conditioned air outlet without coming into contact with said cooling fluid.

6. A cooling system as claimed in claim 5 wherein said cooling section further comprises a direct cooler in line with said indirect exchanger, said cooling circuit is adapted to enable at least a portion of said cooling fluid to pass through said direct cooler, and said return air passes through said direct cooler via said return air path to directly communicate with said cooling fluid.

7. A cooling system as claimed in claim 6 further comprising: a sump for retaining at least a portion of said cooling fluid;

a first pump in line with a first loop of said cooling circuit, said first pump directing said cooling fluid through said first loop of said cooling circuit from said sump to said indirect exchanger, then to said media exchanger, from which said cooling fluid returns to said sump; and a second pump in line with a second loop of said cooling circuit, said second pump directing said cooling fluid through said second loop of said cooling circuit from said sump to said direct cooler from which said cooling fluid returns to said sump.

8. A cooling system as claimed in claim 5 wherein said cooling section further comprises a refrigerant-based cooling unit in line with said indirect exchanger, and said return air passes through said refrigerant-based cooling unit via said return air path to further reduce said temperature of said return air.

9. A cooling system as claimed in claim 1 further comprising:

a sump for retaining at least a portion of said cooling fluid; and a pump in line with said cooling circuit, said pump directing said cooling fluid through said cooling circuit from said sump to said cooling section, then to said media exchanger, from which said cooling fluid returns to said sump.

10. A cooling system comprising:

a media exchanger having an outside air inlet and an outside air outlet, said media exchanger receiving outside air at said outside air inlet via an outside air path; a cooling section having a return air inlet and a conditioned air outlet, said cooling section being configured to receive return air at said return air inlet from an interior space via a return air path;

a cooling circuit for circulating a cooling fluid between said cooling section and said media exchanger, wherein when said cooling fluid circulates into said cooling section, said cooling section reduces a temperature of said return air in said return air path with said cooling fluid to produce conditioned air, and when said cooling fluid circulates into said media exchanger, said media exchanger cools said cooling fluid in said cooling circuit with said outside air in said outside air path and releases said outside air from said system; and a diffusion baffle in communication with said conditioned air outlet for enabling uniform output of said conditioned air from said conditioned air outlet; and a mixing section configured to receive said outside air and having a conditioned air inlet in fluid communication with said conditioned air outlet of said cooling section configured to receive said conditioned air, said mixing section being configured to mix said outside air with said conditioned air received at said conditioned air inlet to produce supply air for release into said interior space, wherein said media exchanger is a first media exchanger, said cooling section is a first cooling section, said conditioned air outlet is a first conditioned air outlet, said cooling circuit is a first cooling circuit, and said cooling system further comprises:

a second media exchanger having a second outside air inlet and a second outside air outlet, said second media exchanger receiving said outside air at said second outside air inlet via a second outside air path;

a second cooling section having a second return air inlet and a second conditioned air outlet, said second cooling section being configured to receive said return air from said interior space via a second return air path;

a second cooling circuit for circulating said cooling fluid between said second cooling section and said second media exchanger, wherein when said second cooling fluid circulates into said second cooling section, said second cooling section reduces said temperature of said return air in said second return air path with said cooling fluid to produce said conditioned air and outputs said conditioned air from said second conditioned air outlet, and when said cooling fluid circulates into said second media exchanger, said second media exchanger cools said cooling fluid in said second cooling circuit with said outside air in said second outside air path and releases said outside air from said system; and a diffusion chamber in communication with each of said first and second conditioned air outlets, said diffusion baffle being located at a chamber outlet of said diffusion chamber, wherein said diffusion chamber is interposed between said first and second conditioned air outlets such that said first and second return air paths oppose one another as said conditioned air enters said diffusion chamber;

said chamber outlet is positioned at an end of said diffusion chamber and is oriented approximately perpendicular to each of first and second conditioned air outlets; and said diffusion baffle is cone shaped with a base and an apex, said base being located at said chamber outlet and said apex extending into said diffusion chamber, and said diffusion baffle including a plurality of openings, wherein ones of said openings proximate said apex are larger in diameter than others of said openings located proximate said base.

* * * * *